(12) United States Patent
Gorce

(10) Patent No.: US 10,365,632 B2
(45) Date of Patent: Jul. 30, 2019

(54) METHOD OF CONTROLLING AN ELECTRICAL TAXIING SYSTEM

(71) Applicant: SAFRAN LANDING SYSTEMS, Velizy-Villacoublay (FR)

(72) Inventor: Clement Gorce, Bussy St. Georges (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 123 days.

(21) Appl. No.: 15/607,724

(22) Filed: May 30, 2017

(65) Prior Publication Data

US 2017/0351242 A1 Dec. 7, 2017

(30) Foreign Application Priority Data

Jun. 2, 2016 (FR) ..................................... 16 55042

(51) Int. Cl.
| | |
|---|---|
| *G05B 19/4062* | (2006.01) |
| *B60T 8/17* | (2006.01) |
| *G05D 1/00* | (2006.01) |
| *G08G 5/00* | (2006.01) |
| *G08G 5/06* | (2006.01) |
| *B64C 13/00* | (2006.01) |
| *B64C 25/40* | (2006.01) |

(52) U.S. Cl.
CPC ........ *G05B 19/4062* (2013.01); *B60T 8/1703* (2013.01); *B64C 13/00* (2013.01); *B64C 25/405* (2013.01); *G05D 1/0083* (2013.01); *G08G 5/0021* (2013.01); *G08G 5/065* (2013.01)

(58) Field of Classification Search
CPC .............. G05B 19/4062; B60T 8/1703; G05D 1/0083; B64C 25/405

USPC ........................................... 701/120; 307/9.1
See application file for complete search history.

(56) References Cited

U.S. PATENT DOCUMENTS

| | | | |
|---|---|---|---|
| 2009/0152942 A1* | 6/2009 | Waite ........................ | H02J 1/14 307/9.1 |
| 2014/0156113 A1* | 6/2014 | Benmoussa ............. | B64C 25/50 701/3 |
| 2016/0122007 A1* | 5/2016 | Cox ....................... | B64C 25/405 701/3 |

FOREIGN PATENT DOCUMENTS

WO    2014/076485 A1    5/2014

OTHER PUBLICATIONS

French Search Report for FR 16 55042 dated Jan. 24, 2017.
French Written Opinion for FR 16 55042 dated Jan. 24, 2017.

* cited by examiner

*Primary Examiner* — Isaac G Smith
(74) *Attorney, Agent, or Firm* — Sughrue Mion, PLLC

(57) ABSTRACT

A method of controlling an aircraft electrical taxiing system, the method comprising the steps of:
  defining a target value (Ld_nmax) for an electrical parameter;
  generating a nominal force command (Cmd_nom) for the electrical taxiing system;
  in parallel with generating the nominal force command (Cmd_nom), using a processing system (2) to produce a maximum command force (Force_max) for the electrical taxiing system so that a real value of the electrical parameter reaches the target value (Ld_nmax), the processing system (2) comprising a regulator loop (4); and (Continued)

generating an optimized force command (Cmd_opt) for the electrical taxiing system equal to the smaller of the nominal force command and the maximum command force.

7 Claims, 4 Drawing Sheets

METHOD OF CONTROLLING AN ELECTRICAL TAXIING SYSTEM

The invention relates to the field of aircraft taxiing.

BACKGROUND OF THE INVENTION

A taxiing system installed on an aircraft enables the aircraft, while taxiing, to travel independently of its main engines, i.e. without the main engines of the aircraft being in use.

While taxiing with an electrical taxiing system, wheels carried by one or more undercarriages are driven in rotation by actuators that include electric motors.

It is possible to make provision for an electrical taxiing system to be incorporated in an aircraft that was not fitted with such a system when it was constructed, i.e. to "retrofit" an electrical taxiing system. It is then appropriate to design an electrical taxiing system in such a manner that the modifications that need to be made to the (electrical and mechanical) interfaces of the aircraft are limited as much as possible.

Under such circumstances, the electric motors of the electrical taxiing system are powered by a pre-existing electrical power supply (e.g. an auxiliary power unit (APU)).

The pre-existing electrical power supply was initially designed to power other onboard electrical systems of the aircraft while the aircraft is on the ground, e.g. a system for steering the aircraft on the ground and a system for braking the aircraft on the ground using electrohydraulic actuators, a de-icing system, a catering system, etc. The pre-existing electrical power supply is thus of dimensions suitable for optimally powering a total load equal to a maximum nominal load.

Since all of the electrical systems powered by the pre-existing electrical power supply do not operate continuously during stages of taxiing, the pre-existing electrical power supply operates for most of the time with a total load that is less than the maximum nominal load, even when the electrical taxiing system is in operation.

Nevertheless, when the total load comes close to the maximum nominal load and an electrical system that was previously not in use is activated, then the total load becomes greater than the maximum nominal load, which runs the risk of damaging the pre-existing electrical power supply, and which reduces the effectiveness with which the electrical systems are powered by the pre-existing electrical power supply.

OBJECT OF THE INVENTION

An object of the invention is to protect and improve the effectiveness of an electrical power supply that is for powering a plurality of electrical systems on board an aircraft, including an electrical taxiing system.

SUMMARY OF THE INVENTION

To this end, the invention provides a method of controlling an electrical taxiing system for moving an aircraft while the aircraft is taxiing, the method comprising the steps of:
defining a target value for an electrical parameter representative of the electricity consumption of a set of electrical systems powered by a common electrical power supply and including the electrical taxiing system;
generating a nominal force command for the electrical taxiing system;
in parallel with generating the nominal force command, using a processing system to produce a maximum command force for the electrical taxiing system so that a real value of the electrical parameter reaches the target value, the processing system comprising a regulator loop having a setpoint defined from the target value and having a command from which the maximum command force is defined; and
generating an optimized force command for the electrical taxiing system equal to the smaller of the nominal force command and the maximum command force.

The method of the invention for controlling an electrical taxiing system thus adapts the command applied to the electrical taxiing system so that the electrical parameter (e.g. a load) representative of the electricity consumption of all of the electrical systems reaches the target value (e.g. a maximum nominal load). The electrical power supply is thus protected and operates properly.

Other characteristics and advantages of the invention appear on reading the following description of a particular, non-limiting embodiment of the invention.

BRIEF DESCRIPTION OF THE DRAWINGS

Reference is made to the accompanying drawings, in which.

DETAILED DESCRIPTION OF THE INVENTION

Figure 1:
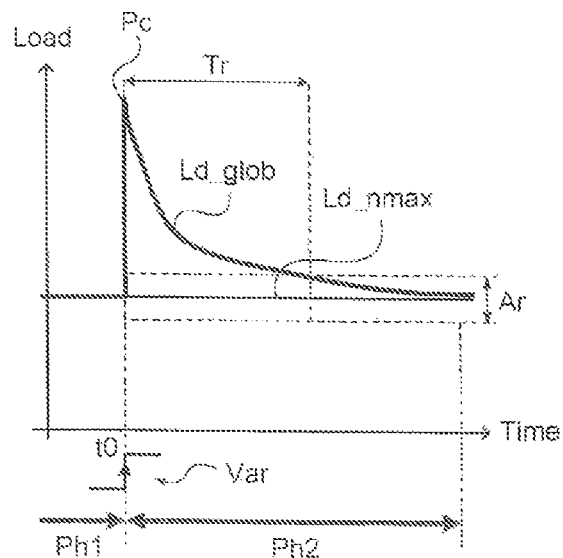
FIG. 1 is a graph plotting a curve for a maximum nominal load and a curve for a global load at the moment when a de-icing system is activated, in a first implementation of the invention.

The method of the invention for controlling an electrical taxiing system is performed in an aircraft including landing gear.

The landing gear comprises a rod slidably mounted in a strut of the landing gear and carrying two wheels.

The electrical taxiing system acts on the two wheels of the landing gear in order to move the aircraft independently while it is taxiing.

In this example, the electrical taxiing system comprises an actuator comprising an electric motor, an electrical power module (commonly referred to as a computer, a controller, power electronics, etc.) and an electrical control module (commonly referred to as a computer, a controller, control electronics, etc.). The electrical power module and the control module may naturally be integrated within a single electrical unit.

During stages of taxiing, the pilot of the aircraft issues a taxiing order in order to move the aircraft (along a certain track, in a certain direction, at a certain speed, with a certain acceleration, etc.). The electrical control module uses the taxiing order to generate a force command for the electrical power module (e.g. a command specifying a torque, or a speed, or a force). On the basis of the force command, the electrical power module generates an electrical control current and applies it to the electric motor.

The taxiing system is powered by an electrical power supply, specially an APU. Naturally, an electrical power supply other than an APU could be used.

Other electrical systems onboard the aircraft are also powered by the APU when the aircraft is on the ground (and thus in particular while the aircraft is taxiing). The other onboard electrical systems include a system for steering the aircraft on the ground, a system for braking the aircraft on the ground, a de-icing system, and a catering system.

In this example, the APU thus powers a set of electrical systems including, in addition to the electrical taxiing system, the ground steering system, the ground braking system, the de-icing system, and the catering system.

In this example, the APU was initially designed to power only the ground steering system, the ground braking system, the de-icing system, and the catering system, preferably at a load equal to a maximum nominal load. The maximum nominal load is the maximum load value for which the APU operates in nominal manner. The operation of the APU under the maximum nominal load thus corresponds to "optimized" nominal operation in which the power delivered by the APU is at a maximum.

When the aircraft and the APU were being designed, no provision was made to incorporate the electrical taxiing system. Thus, while the electrical taxiing system is in operation, it is possible, in particular if all of the other electrical systems of the set of electrical systems are in operation as well, for the global load as seen by the APU to become greater than the maximum nominal load.

The method of the invention for controlling an electrical taxiing system (referred to as the "control method" in the description below) that is performed in the above-mentioned electrical control module performs both a function of protecting the APU and a function of optimizing the APU. The purpose of the protection function is to protect the APU by avoiding the global load being greater than the maximum nominal load for any significant duration. The optimization function seeks to ensure that the global load, if it is less that the maximum nominal load, reaches the maximum nominal load in order to optimize utilization of the APU.

Concerning utilization of the APU, the electrical taxiing system is thus considered in this example as the electrical system having lowest priority from among all of the electrical systems.

Figure 2:
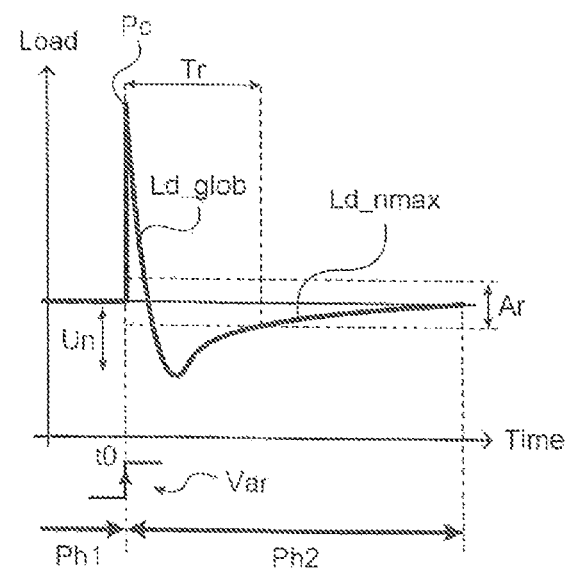
FIG. 2 is a figure analogous to FIG. 1, the curves corresponding to a second implementation of the invention.

Implementation of the protection function is illustrated initially with reference to FIGS. 1 and 2.

While the aircraft is taxiing, consideration is given to a first stage of operation Ph1 during which all of the electrical systems are in operation so that the global load Ld_glob seen by the APU is equal to the maximum nominal load Ld_nmax. During the first stage of operation, Ph1, the electrical taxiing system is activated, but at least one of the electrical systems from the set of all of the electrical systems is at rest, e.g. the de-icing system.

A second stage of operation Ph2 starts on activation of the de-icing system, at time t0. In FIGS. 1 and 2, this activation is represented by a variable Var going from a low state to a high state, where the variable Var represents the activation or the deactivation of the de-icing system. The electrical taxiing system continues to be activated during the second stage of operation Ph2.

When the de-icing system is activated, the global load Ld_glob seen by the APU increases and becomes considerably greater than the maximum nominal load Ld_nmax. It is therefore appropriate to protect the APU.

The control method produces an optimized force command that reduces the taxiing load corresponding to the taxiing system at the moment t0, in such a manner that the global load Ld_glob seen by the APU decreases in order once more to reach the maximum nominal load Ld_nmax.

In a first implementation of the invention as shown in FIG. 1, the global load Ld_glob increases suddenly at the moment t0 so as to reach a load peak Pc as a result of the de-icing system being activated, and it then decreases rapidly as a result of performing the control method at time t0. The maximum nominal load Ld_nmax is reached after a response time Tr of the control method. By "reached" it should be understood that the difference between the global load Ld_glob and the maximum nominal load Ld_nmax lies within a predetermined accuracy range Ar representing the accuracy of the control method.

Naturally, it is appropriate for the length of time during which the global load is greater than the maximum nominal load Ld_nmax, and thus the response time Tr, to be limited as much as possible.

In order to reduce this duration, it is advantageous for the profile of the global load Ld_glob to be similar to that obtained in the second implementation of the invention as shown in FIG. 2.

It can be seen that the global load Ld_glob in FIG. 2 decreases rapidly so as to drop below the maximum nominal load Ld_nmax, and then tends towards the maximum nominal load Ld_nmax.

The global load Ld_glob thus presents a relatively large amount of undershoot. The undershoot is defined in this example as the maximum value of the difference between the maximum nominal load Ld_nmax and the global load Ld_glob in the transient stage, when the global load Ld_glob is less than the maximum nominal load Ld_nmax.

Figure 3:
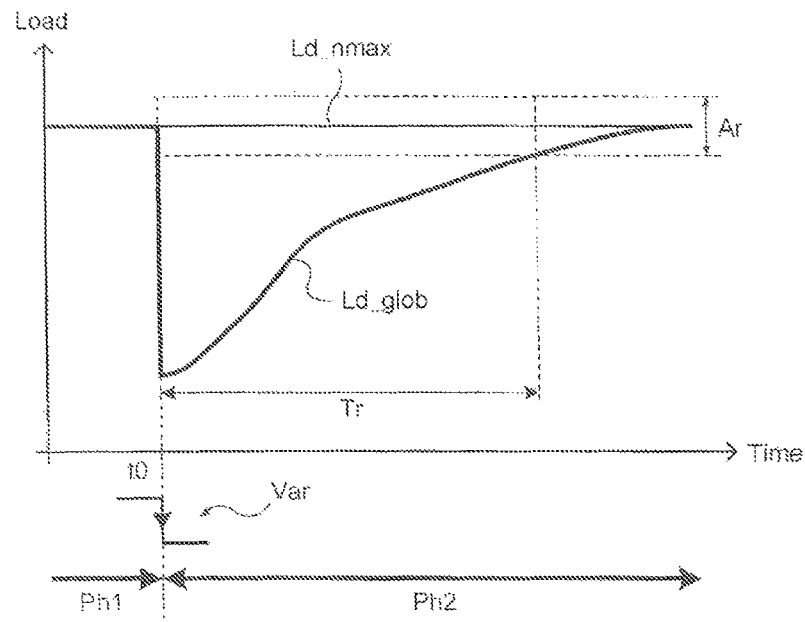
FIG. 3 is a figure analogous to FIG. 1, at the moment when the de-icing system is deactivated.

The way the optimization function is performed is described below with reference to FIG. 3.

While the aircraft is taxiing, consideration is given to an initial stage Ph1 during which all of the electrical systems are in operation and during which the global load Ld_glob as seen by the APU is equal to the maximum nominal load Ld_nmax. During the initial stage of operation Ph1, the de-icing system and the electrical taxiing system are both active.

A second stage of operation Ph2 thus begins when the de-icing system is deactivated at time t0. In FIG. 3, this deactivation is represented by the variable Var going from a high state to a low state. The electrical taxiing system continues to be active during the second stage of operation Ph2.

The control method seeks to produce an optimized force command that increases the taxiing load represented by the taxiing system at the moment to, so that the global load Ld_glob seen by the APU reaches the maximum nominal load Ld_nmax. The taxiing performance is thus improved (in terms of speed, acceleration, motor torque, etc.) and the value of the global load seen by the APU enables it to operate in optimum manner.

It should be observed that it is preferable for the response time Tr to be longer than that obtained when performing the protection function (see FIGS. 1 and 2). Specifically, in the present circumstances, too rapid a response time Tr would lead to a large amount of overshoot in the global load. The overshoot is defined in this example as being the maximum value of the difference between the global load Ld_glob and the maximum nominal load Ld_nmax during the transient stage while the global load Ld_glob is greater than the maximum nominal load Ld_nmax.

Figure 4:
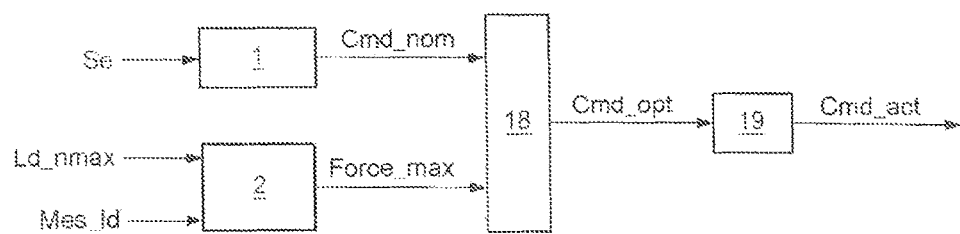
FIG. 4 shows a method of the invention for controlling an electrical taxiing system.

With reference to FIG. 4, there follows a description in greater detail of how the control method is implemented.

The control method initially includes using a nominal force control block 1. The nominal force control block 1 receives input signals Se produced from the taxiing order generated by the pilot of the aircraft. The nominal force control block 1 generates a nominal force command Cmd_nom as a function of the input signals Se. The nominal force command Cmd_nom is for controlling the electric motor of the actuator of the electrical taxiing system.

The nominal force command Cmd_nom generated by the nominal force command 1 is a conventional force command, as generated by a prior art method of controlling a taxiing system. The nominal force command block 1 is therefore not described in greater detail herein.

The control method further includes using a processing system 2 in parallel with using the nominal force control block 1.

Figure 5:
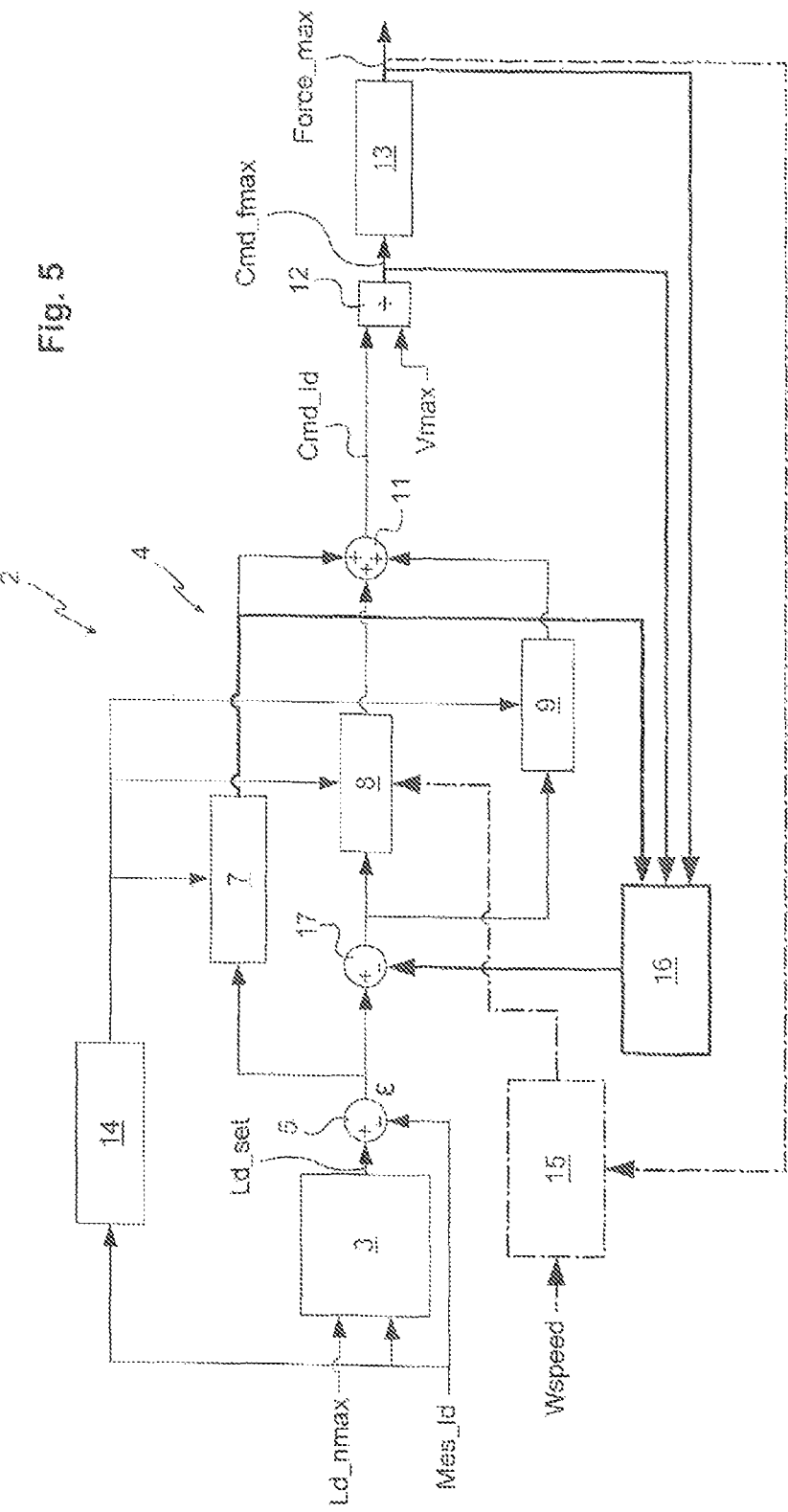
FIG. 5 shows a processing system used in the method of the invention for controlling an electrical taxiing system.

The processing system 2 can be seen in greater detail in FIG. 5.

The purpose of the processing system 2 is to produce a maximum force command Force_max for the electrical taxiing system so that the real value of the real global load on the APU reaches the maximum nominal load Ld_nmax.

The inputs to the processing system 2 comprise the maximum nominal load Ld_nmax, a measurement of the global load Mes_ld, and a speed Wspeed of the wheels driven by the electrical taxiing system.

The processing system 2 includes a setpoint processing block 3 that uses the maximum nominal load Ld_nmax and the measured global load Mes_ld to produce a load setpoint Ld_set.

Figure 6:
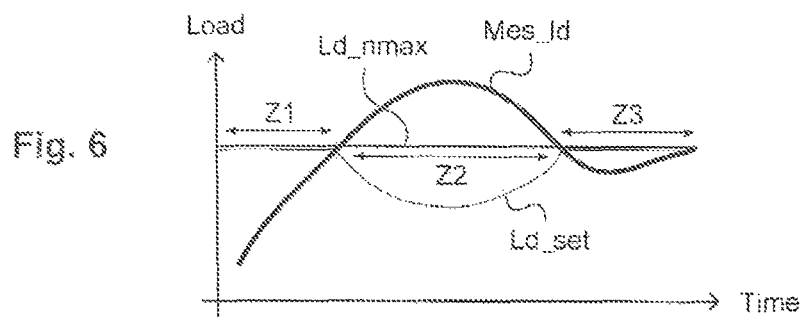
FIG. 6 is a graph showing a curve for a load setpoint, a curve for a measured global load, and a curve for a maximum nominal load.

With reference to FIG. 6, which illustrates the use of the setpoint processing block 3 by means of an example, the load setpoint Ld_set is equal to the maximum nominal load Ld_nmax when the measurement of the global load Mes_ld presents overshoot of less than a predetermined overshoot threshold (zones Z1 and Z3) and the load setpoint Ld_set is equal to the maximum nominal load Ld_nmax minus the overshoot when the measurement of the global load Mes_ld presents overshoot that is greater than the predetermined overshoot threshold (zone Z2). In this example, the predetermined threshold is zero, but it could naturally have some other value.

The processing system 2 also includes a regulator loop 4.

The regulator loop 4 has as its setpoint the load setpoint Ld_set.

The regulator loop 4 has a first subtractor 5 that subtracts the measurement of the global load Mes_ld from the load setpoint Ld_set in order to produce an error $\varepsilon$ for the regulator loop 4.

The regulator loop 4 also includes a proportional integral and derivative regulator having a proportional block 7, an integral block 8, and a derivative block 9.

Figure 7:
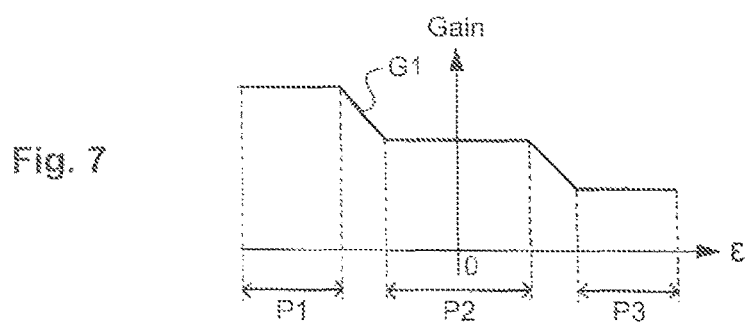
FIG. 7 is a graph plotting a curve for gain of a proportional block.
Figure 8:
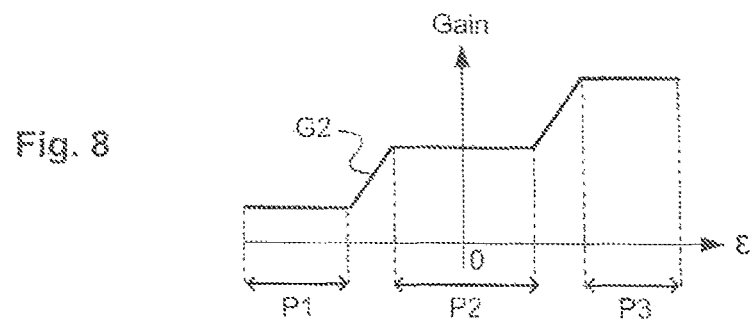
FIG. 8 is a graph plotting a curve for gain of an integral block.
Figure 9:
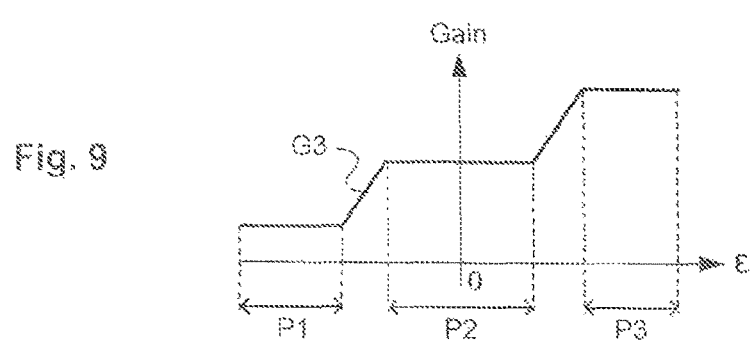
FIG. 9 is a graph plotting a curve for gain of a derivative block.

The curve for the gain G1 of the proportional block 7, visible in FIG. 7, the curve for the gain G2 of the integral block 8, visible in FIG. 8, and the curve for the gain G3 of the derivative block 9, visible in FIG. 9, all present three portions depending on the values of the error $\varepsilon$: a first portion P1 corresponding to a negative error $\varepsilon$ of large absolute value, a second portion P2 corresponding to a small error $\varepsilon$ (corresponding to the above-mentioned accuracy range Ar), and a third portion P3 corresponding to an error $\varepsilon$ that is positive and large.

In each gain curve G1, G2, G3, the first portion P1 corresponds to a first constant gain, the second portion P2 corresponds to a second constant gain, and the third portion P3 corresponds to a third constant gain.

The proportional block 7 presents a high first gain, a medium second gain, and a small third gain.

The first portion corresponds to a large error $\varepsilon$ (equivalent to overshoot) that needs to be corrected rapidly, by using the high first gain, in order to protect the APU from a global load that is too great.

The medium second gain enables the regulator loop 4 to be robust against small disturbances when the error $\varepsilon$ is small (in the accuracy range Ar).

The low third gain serves to avoid overshoot while performing the optimization function.

It should be observed that the proportional block 7 is designed solely with reference to the electrical systems in the set of electrical systems not including the electrical taxiing system. The general shape of the global load of the complete set of electrical systems (i.e. including the electrical taxiing system) is defined both by the proportional block 7 and by the load setpoint Ld_set.

The integral block 8 presents a low first gain, a medium second gain, and a high third gain.

When the regulator loop 4 is stabilized, the output from the integral block 8 following a progressive transition takes on the value of the maximum nominal load Ld_nmax minus the load of all of the electrical systems (except for the electrical taxiing system).

The derivative block 9 also presents a low first gain, a medium second gain, and a high third gain.

The derivative block 9 serves to improve the stability of the regulator loop 4 concerning the adjustment of the proportional, integral corrector that is equivalent to the combination of the proportional block 7 and of the integral block 8, serving to avoid as much as possible any occurrence of overshoot.

The regulator loop 4 also includes a summing circuit 11 that adds together the output from the proportional block 7, the output from the integral block 8, and the output from the derivative block 9 in order to produce a load command Cmd_ld at the output from the regulator loop 4.

The processing system 2 also includes a divider block 12. The divider block 12 transforms the load command Cmd_ld into a maximum force command Cmd_fmax using the following formula:

$$Cmd\_Ld = Vmax \times Cmd\_fmax$$

where Vmax is a maximum speed for the wheels driven in rotation by the electrical taxiing system.

Thus, a given increase in the load command Cmd_ld leads to a decrease in the maximum force command Cmd_fmax that is smaller at high speed than at low speed.

Whereas the proportional, integral, and derivative regulator makes it possible to obtain good dynamic behavior for the processing system 2, the divider block 12 makes it possible to obtain good dynamic behavior for the maximum force command Cmd_fmax.

The processing system 2 also includes a slope limiter block 13 that serves to limit variations in the maximum force command Cmd_fmax. The slope limiter block 13 serves to adapt the output from the processing system 2, which has a response time that is very fast, to the much slower dynamic behavior of the aircraft taxiing.

The processing system 2 also includes an activation block 14 which receives the measurement of the global load Mes_ld and which activates the processing system 2 when the measurement of the global load Mes_ld is above a predetermined load threshold. The predetermined load threshold is defined as a function of an average of the taxiing load.

Thus, by way of example, if the maximum nominal load Ld_nmax is equal to 100 and if the average of the taxiing load is equal to 30, the predetermined load threshold is equal to 100−30=70.

When the processing system 2 is activated, the integral block 8 is initialized with the current taxiing load so that the output from the integral block 8 is as close to possible to its stabilized value, so as to avoid generating an overshoot on the global load seen by the APU.

The processing system 2 also includes a block 15 for estimating taxiing load, which receives a measurement of the speed of the wheels Wspeed driven in rotation by the electrical taxiing system, and also the maximum command force Force_max at the output from the processing system 2. The taxiing load estimator block 15 uses a mechanical equation based on the measurement of the wheel speed Wspeed and on the maximum command force Force_max in order to initialize the integral block 8.

Finally, the processing system 2 includes an anti-windup block 16 that performs an anti-windup function. The anti-windup block 16 acts, at a given time tn, to reduce a non-saturated load equal to the difference between the maximum force command Cmd_fmax and the maximum command force Force_max produced at time tn−1 by the processing system 2.

The anti-windup block 16 uses the values of the gain curve G1 for the proportional block 7 together with the division performed by the divider block 12 in order to prevent windup. The anti-windup block 16 makes use, if necessary, of one or more weighting coefficients. The anti-windup block 16 performs feedback processing, which makes it possible to keep the values output by the integral block 8 and by the derivative block 9 away from saturation zones. The use of the anti-windup block 16 thus enables the processing system 2 to retain good reactivity by avoiding any use of filters to achieve a similar result, given that such filters possess coefficients that would lead to significant losses of time during updating in real time.

With reference once more to FIG. 4, the control method further includes using a minimum force selector block 18, which generates an optimized force command Cmd_opt for the taxiing system by selecting the minimum between the nominal force command Cmd_nom and the maximum command force Force_max.

The minimum force selector block 18 selects the minimum in absolute value between the nominal force command Cmd_nom and the maximum command force Force_max and it retains the sign of the nominal force command Cmd_nom if it is selected, or of the maximum command force Force_max if it is selected.

The control method also includes using a force management block 19 which transforms the optimized force command Cmd_opt into an actual force command Cmd_act that is used for controlling the electric motor.

Where necessary, the force management block 19 applies limits (saturation, slope limit, etc.), adjustments for ensuring that the actual force command Cmd_act complies with the standards being used (sign, unit, etc.), or indeed carries out switching between a plurality of control methods. Naturally, it is possible for the force management block 19 to perform no operation, and thus for the optimized force command Cmd_opt to be equal to the actual force command Cmd_act.

Naturally, the invention is not limited of the implementation described but covers any variant coming within the ambit of the invention as defined by the claims.

Although a processing system is defined for producing a maximum command force for the electrical taxiing system that enables the global load seen by the APU to reach a maximum nominal load, it is possible, instead of defining the maximum nominal load, to define some other target value (e.g. any nominal load).

The invention can also be performed using an electrical parameter other than load and representative of the electricity consumption of a set of electrical systems, e.g. the current drawn by all of the electrical systems, a voltage at the input to all of the electrical systems, a level of power or energy that is consumed, etc.

The invention claimed is:

1. A method of controlling an electrical taxiing system having an actuator comprising an electric motor, the electrical taxiing system being used for moving an aircraft while the aircraft is taxiing, the method being implemented by a processing system (2), being used for protecting and improving the effectiveness of a common electrical power supply, and comprising the steps of:
    defining a target value (Ld_nmax) for an electrical parameter representative of the electricity consumption of a set of electrical systems powered by the common electrical power supply and including the electrical taxiing system;
    generating a nominal force command (Cmd_nom) for the electrical taxiing system;
    in parallel with generating the nominal force command (Cmd_nom), using the processing system (2) to produce a maximum command force (Force_max) for the electrical taxiing system, the maximum command force being such that, when the maximum command force is applied on the electrical taxiing system, a real value of the electrical parameter will reach the target value (Ld_nmax), the processing system (2) comprising a regulator loop (4) having a setpoint (Ld_set) defined from the target value (Ld_nmax) and having a command (Cmd_ld) from which the maximum command force (Force_max) is defined;
    generating an optimized force command (Cmd_opt) for the electrical taxiing system equal to the smaller of the nominal force command and the maximum command force;
    generating, from the optimized force command, an electrical control command; and
    applying the electrical control command to the electric motor of the actuator to move the aircraft.

2. The method according to claim 1, wherein the electrical parameter is a global load (Ld_glob) for the set of electrical systems.

3. A control The method according to claim 1, wherein the setpoint (Ld_set) is equal to the target value (Ld_nmax)

when a measured value (Mes_ld) of the electrical parameter presents overshoot less than a predetermined overshoot threshold, and wherein the setpoint is equal to the target value minus the overshoot when the measured value presents an overshoot greater than or equal to the predetermined overshoot threshold.

4. The method according to claim 1, wherein the regulator loop (4) includes a proportional, integral, and derivative regulator having a proportional block (7), an integral block (8), and a derivative block (9).

5. The method according to claim 4, wherein curves of gain as a function of error ($\varepsilon$) of the regulator loop (4) for the proportional block (7), the integral block (8), and the derivative (9), all comprise three respective portions of constant gain.

6. The method according to claim 1, wherein the processing system (2) includes a divider block (12) that divides the command (Cmd_ld) of the regulator loop (4) by a wheel speed in order to obtain the maximum command force (Force_max).

7. The method according to claim 1, wherein the target value is a maximum nominal value.

\* \* \* \* \*